United States Patent
Kasireddy

(10) Patent No.: US 8,380,568 B2
(45) Date of Patent: Feb. 19, 2013

(54) DISTRIBUTING CONSUMER DEMAND UPSTREAM IN A SUPPLY CHAIN

(75) Inventor: Vijay G. Kasireddy, Coppell, TX (US)

(73) Assignee: JDA Software Group, Inc., Scottsdale, AZ (US)

( * ) Notice: Subject to any disclaimer, the term of this patent is extended or adjusted under 35 U.S.C. 154(b) by 1772 days.

(21) Appl. No.: 10/672,537

(22) Filed: Sep. 26, 2003

(65) Prior Publication Data

US 2005/0071220 A1    Mar. 31, 2005

(51) Int. Cl.
*G06Q 30/00* (2012.01)
(52) U.S. Cl. ............... 705/14.24; 705/28; 705/14.35; 705/14.1
(58) Field of Classification Search .............. 705/14, 705/14.24, 14.35, 28, 26.2, 22, 26, 27
See application file for complete search history.

(56) References Cited

U.S. PATENT DOCUMENTS

| | | | | |
|---|---|---|---|---|
| 5,510,780 A | * | 4/1996 | Norris et al. | 340/825.56 |
| 5,524,077 A | * | 6/1996 | Faaland et al. | 705/8 |
| 5,569,897 A | * | 10/1996 | Masuda | 235/379 |
| 5,794,207 A | * | 8/1998 | Walker et al. | 705/1 |
| 6,055,519 A | * | 4/2000 | Kennedy et al. | 705/80 |
| 7,257,552 B1 | * | 8/2007 | Franco | 705/28 |
| 7,653,591 B1 | * | 1/2010 | Dabney | 705/38 |
| 2002/0077850 A1 | * | 6/2002 | McMenimen et al. | 705/2 |
| 2003/0050819 A1 | * | 3/2003 | Koenigbauer et al. | 705/8 |
| 2003/0074284 A1 | * | 4/2003 | Bowden | 705/28 |
| 2003/0195791 A1 | * | 10/2003 | Waller et al. | 705/10 |
| 2003/0200150 A1 | * | 10/2003 | Westcott et al. | 705/26 |
| 2004/0024675 A1 | * | 2/2004 | Lahre et al. | 705/36 |

FOREIGN PATENT DOCUMENTS

WO    WO 9945450    *    9/1999

OTHER PUBLICATIONS

Cheung, Ki Ling,"A continuous review of inventory model with a time discount". IIE Transactions. vol. 30. Issue 8. 1998.*
Dae H. Kim and Kyung S. Park Source , "(Q,r) Inventory Model with a Mixture of Lost Sales and Time-Weighted Backorders", □The Journal of the Operational Research Society, vol. 36, No. 3, (Mar. 1985), pp. 231-238.*
An Inventory Model of Immediate and Delayed Delivery □Kamran Moinzadeh o Charles Ingene □School of Business, University of Washington, Seattle, Washington 98195.*

(Continued)

*Primary Examiner* — Khanh H Le
(74) *Attorney, Agent, or Firm* — Jackson White, PC; Steven J. Laureanti

(57) ABSTRACT

In one embodiment, a computer-implemented method for distributing consumer demand upstream in a supply chain includes receiving, at a current time, an indication of consumer demand for a product that a consumer may be willing to receive at a future date rather than the current date in exchange for an incentive. The method also includes determining a particular incentive based on an order lead time for the product and conveying the particular incentive to allow the consumer to choose whether to receive the product at the particular future date rather than the current date in exchange for the particular incentive. If the consumer chooses to receive the product at the particular future date rather than the current date in exchange for the particular incentive, an order for the product is communicated to the upstream supply chain entity to allow the consumer to receive the product at the particular future date from current inventory of the upstream supply chain entity rather than from current inventory of the downstream supply chain entity in exchange for the particular incentive.

28 Claims, 3 Drawing Sheets

OTHER PUBLICATIONS

Definition of liquidated damages by Investopedia.com. Investopedia Inc. Oct. 7, 2008.<Dictionary.com http://dictionary.reference.com/browse/liquidated damages>.*

Rema Hariharan and Paul Zipkin, Customer-Order Information, Leadtimes, and Inventories Journal or Book Title: Management Science 1995 41:1599-1607.*

Chen, Fangruo; "Market Segmentation, Advanced Demand Information, and Supply Chain Performance," Manufacturing & Service Operations Management, Winter 2001, v3i1 p. 53; Proquest #576021031, 15 pgs.*

* cited by examiner

DISTRIBUTING CONSUMER DEMAND UPSTREAM IN A SUPPLY CHAIN

TECHNICAL FIELD OF THE INVENTION

This invention relates in general to supply chain management and in particular to distributing consumer demand upstream in a supply chain.

BACKGROUND

In a typical supply chain, one or more suppliers may supply materials to one or more original equipment manufacturers (OEMs), the OEMs may manufacture products from the materials and ship the products to one or more distributors, and distributors may ship the products to one or more retailers for sale to consumers. Each link in the supply chain may be associated with a delay, and the delay at each link may complicate management of the supply chain. In addition, there may be delays in the communication of demand from downstream supply chain entities to upstream supply chain entities that may further complicate management of the supply chain. The unpredictability of consumer demand may complicate management of the supply chain even further. These and other complications may increase costs for entities in the supply chain.

SUMMARY OF THE INVENTION

Particular embodiments of the present invention may reduce or eliminate disadvantages and problems associated with supply chain management.

In one embodiment of the present invention, a computer-implemented method for distributing consumer demand upstream in a supply chain includes receiving, at a current time, an indication of consumer demand for a product that a consumer may be willing to receive at a future date rather than the current date in exchange for an incentive. The method also includes determining a particular incentive based on an order lead time for the product, the order lead time for the product representing a time difference between a particular future date and the current date, the order lead time being longer than a supply channel delay between the downstream supply chain entity and an upstream supply chain entity, the particular incentive reflecting cost savings to the downstream supply chain entity associated with the order lead time. The method also includes conveying the particular incentive to allow the consumer to choose whether to receive the product at the particular future date rather than the current date in exchange for the particular incentive. The method also includes, if the consumer chooses to receive the product at the particular future date rather than the current date in exchange for the particular incentive, communicating an order for the product to the upstream supply chain entity to allow the consumer to receive the product at the particular future date from current inventory of the upstream supply chain entity rather than from current inventory of the downstream supply chain entity in exchange for the particular incentive. The cost savings to the downstream supply chain entity associated with the order lead time and reflected in the particular incentive include cost savings associated with the consumer receiving the product at the particular future date from current inventory of the upstream supply chain entity rather than from current inventory of the downstream supply chain entity.

Particular embodiments of the present invention may provide one or more technical advantages. Particular embodiments may reduce volatility, unpredictability, or both associated with consumer demand. Particular embodiments may reduce safety-stock requirements at one or more entities in a supply chain. Particular embodiments may reduce inventory requirements at one or more entities in a supply chain. Particular embodiments may reduce requirements associated with redundant stocking points in a supply chain. Particular embodiments may improve transportation optimization in a supply chain. Particular embodiments may enable one or more supply chain entities to more accurately forecast consumer demand. Particular embodiments may reduce costs incurred by one or more supply chain entities. Particular embodiments may reduce prices that may be offered to consumers. In particular embodiments, the value of one or more of these advantages to one or more supply chain entities may increase as product costs increase. In particular embodiments, the value of one or more of these advantages to one or more supply chain entities may increase as lead times of firm consumer orders increase.

Certain embodiments may provide all, some, or none of these technical advantages. Certain embodiments may provide one or more other technical advantages, one or more of which may be readily apparent to those skilled in the art from the figures, descriptions, and claims herein.

BRIEF DESCRIPTION OF THE DRAWINGS

To provide a more complete understanding of the present invention and the features and advantages thereof, reference is made to the following description, taken in conjunction with the accompanying drawings, in which.

DESCRIPTION OF EXAMPLE EMBODIMENTS

Figure 1:
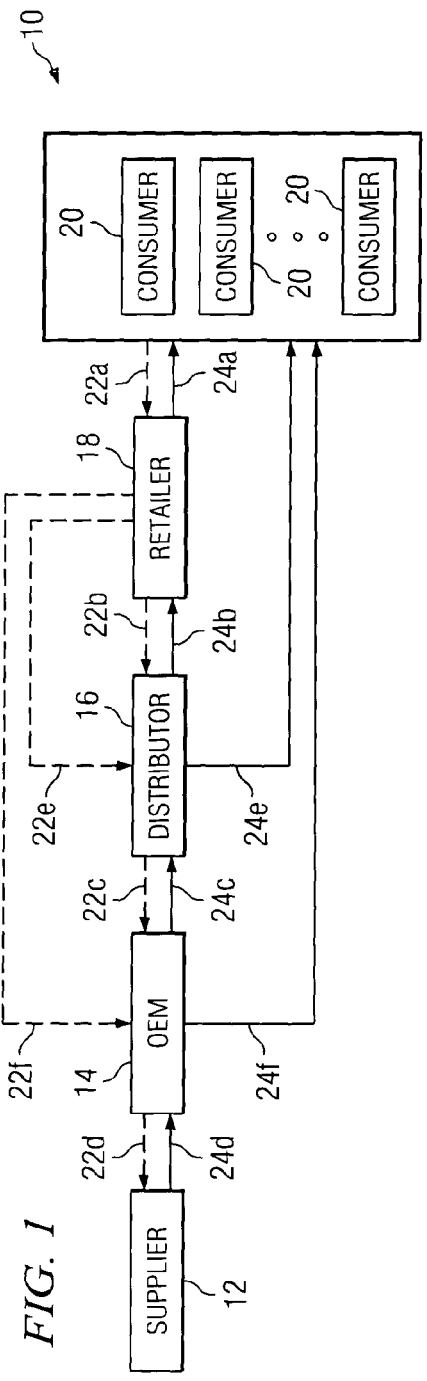
FIG. 1 illustrates an example system for distributing consumer demand upstream in a supply chain.

FIG. 1 illustrates an example system 10 for distributing consumer demand upstream in a supply chain. System 10 includes one or more suppliers 12, one or more OEMs 14, one or more distributors 16, one or more retailers 18, and one or more consumers 20. Although system 10 is illustrated and described for simplicity as including one supplier 12, one OEM 14, one distributor 16, one retailer 18, and multiple consumers 20, the present invention contemplates any suitable numbers of suppliers 12, OEMs 14, distributors 16, retailers 18, and consumers 20. As an example, multiple distributors 16 may supply products to retailer 18, multiple OEMs 14 may supply products to each distributor 16, and multiple suppliers 12 may supply materials to each OEM 14. Although supplier 12, OEM 14, distributor 16, retailer 18, and consumers 20 are illustrated and described as being separate from each other, the present invention contemplates two or more of these supply chain entities being combined, according to particular needs. As an example, supplier 12 and OEM 14 may be supply chain entities within a single enterprise or distributor 16 and retailer 18 may be supply chain entities within a single enterprise. Furthermore, although system 10 is illustrated and described as including each of these supply chain entities, the present invention also contemplates system 10 excluding one or more of these supply chain entities, according to particular needs. As an example, system 10 may exclude distributor 16 and OEM 14 may therefore supply products directly to retailer 18.

Supplier 12 includes one or more supply chain entities that supply materials to OEM 14. Materials may include raw materials, component parts, or other materials that OEM 14 may use to manufacture products. OEM 14 includes one or more supply chain entities that manufacture products from materials provided by supplier 12. A product may be any item that may be purchased by a consumer 20. Examples of products include television sets, computer systems, cars, furniture items, capital equipment, and other products. Distributor 16 includes one or more supply chain entities that receive products manufactured by OEM 14 and distribute the products to one or more retailers 18.

Retailer 18 includes one or more supply chain entities that sell products to consumers 20. Retailer 18 may include one or more websites that consumers 20 may access to purchase products from retailer 18. In addition or as an alternative, retailer 18 may include one or more call centers that receive telephone orders from consumers 20. In addition or as an alternative, retailer 18 may include one or more physical locations (such as stores) where consumers 20 may purchase products from retailer 18. A consumer 20 includes one or more supply chain entities that purchase products from retailer 18. As an example, consumer 20 may include an individual purchasing a product for personal use. As another example, consumer 20 may include an enterprise purchasing a product for business use. As another example, consumer 20 may include one or more computer systems programmed to automatically search for and purchase products from retailer 18 through interaction with one or more computer systems associated with retailer 18.

Supplier 12, OEM 14, distributor 16, and retailer 18 may each include one or more distribution centers that facilitate the shipment of materials or products. As an example, supplier 12 may include one or more distribution centers that process materials for shipment to OEM 14 and ship or coordinate shipment of the materials to OEM 14. Processing an item for shipment may include determining how and according to what schedule the item will be shipped. Processing the item for shipment may also include selecting one or more sites the item will be shipped from and one or more sites the item will be shipped to. OEM 14 may include one or more distribution centers that receive materials from supplier 12 and process the materials for manufacture of products. OEM 14 may also include one or more distribution centers that process products for shipment to distributor 16 and ship or coordinate shipment of the products to distributor 16. Distributor 16 may include one or more distribution centers that receive products from OEM 14, process the products for shipment to retailer 18, and ship or coordinate shipment of the products to retailer 18. Retailer 18 may include one or more distribution centers that receive products from distributor 16, process the products for retail, and distribute the products to one or more sites associated with retailer 18.

Consumers 20 communicate consumer demand to retailer 18 via demand channel 22a to purchase products from retailer 18. Retailer 18 supplies products to consumers 20 via supply channel 24a in response to consumer demand. Supply channel 24a may include one or more processes, sites, and modes of transportation for supplying products to consumers 20. As an example, supply channel 24a may include one or more physical locations (such as stores) where consumers 20 may purchase products from retailer 18 and one or more processes for effecting the purchases. As another example, supply channel 24a may include a warehouse and one or more processes and modes of transportation for effecting shipment of products from the warehouse to consumers 20.

In a traditional supply chain, demand channel 22a communicates zero lead time consumer demand to retailer 18. In this case, when a consumer 20 purchases a product from retailer 18, the product is provided to consumer 20 more or less immediately after the purchase. As an example, when a consumer 20 purchases a product from retailer 18 at a store, consumer 20 typically leaves the store with the product. As another example, when a consumer purchases a product from retailer 18 at a website, retailer 18 typically ships the product to consumer 20 more or less immediately after the purchase. As a result, in a traditional supply chain, retailer 18 must have inventory in stock to meet zero lead time consumer demand. Expressed another way, retailer 18 must have inventory in stock at time t to meet consumer demand at time t. However, consumer demand is typically unknown beforehand. As described below, the unpredictable nature of consumer demand causes retailer 18 to incur certain costs.

Retailer 18 communicates retailer demand to distributor 16 via demand channel 22b to purchase products from distributor 16. Distributor 16 supplies products to retailer 18 via supply channel 24b in response to retailer demand. Supply channel 24b may include one or more processes, sites, and modes of transportation for supplying products to retailer 18. A delay is associated with supply channel 24b. Because of the delay, retailer 18 must order products from distributor 16 in advance to have inventory in stock by a certain date. As an example, it may take approximately ten days to process products for shipment from distributor 16 to retailer 18, ship the products from distributor 16 to retailer 18, and process the products at retailer 18 for sale to consumers 20. Because of the ten day delay associated with supply channel 24b, retailer 18 must order products from distributor 16 no later than t−10 to have inventory in stock to meet consumer demand at time t.

Since retailer 18 must order products from distributor 16 in advance to meet consumer demand at time t, retailer 18 may forecast consumer demand to determine how many products to order from distributor 16 and when to order the products. As an example, at time t−10, retailer 18 may forecast that consumer demand at time t will be five hundred. Because of the ten day delay associated with supply channel 24b, retailer 18 may order five hundred products from distributor 16 at time t−10 to meet the forecasted consumer demand at time t. Retailer 18 may use current actual consumer demand, past actual consumer demand, or both to forecast consumer demand. However, as a result of the unpredictable nature of consumer demand, forecasting consumer demand is typically a difficult task. As described below, inaccuracies in forecasted consumer demand may cause retailer 18 to incur certain costs.

To reduce the likelihood that retailer 18 will be unable to meet consumer demand if actual consumer demand exceeds forecasted consumer demand, retailer 18 may maintain safety stock in inventory. As an example, if retailer forecasts consumer demand of five hundred for time t, retailer 18 may choose to have five hundred fifty products (instead of just five hundred) in inventory at time t to meet the forecasted consumer demand. The additional fifty products kept as safety stock may cover some or all actual consumer demand at time t that exceeds the forecasted consumer demand. Retailer 18 may maintain as safety stock a percentage of inventory that retailer 18 must have in stock to meet forecasted consumer demand. The percentage may be determined according to historical differences between forecasted consumer demand and actual consumer demand. However, as a result of the unpredictable nature of consumer demand and the inaccuracies associated with forecasting consumer demand, determining safety stock levels at retailer 18 is typically a difficult task. As described below, inaccuracies in determining safety stock levels may cause retailer 18 to incur certain costs.

Regarding the various costs described above, retailer 18 typically loses a sale and associated profit (the marginal cost of the lost sale) if a product that a consumer 20 attempts to purchase is not currently in inventory. Thus, retailer 18 may desire to maintain high enough inventory levels to ensure that few, if any, sales are lost. However, retailer 18 incurs carrying costs for each product kept in inventory. Carrying costs may include costs associated with storing the product, costs associated with the product becoming less valuable over time, and other carrying costs. To reduce carrying costs, retailer 18 may attempt to accurately forecast consumer demand and order products from distributor 16 just in time to meet the forecasted consumer demand. If retailer 18 orders fewer products than consumers 20 purchase, marginal costs due to lost sales increase for retailer 18. If retailer 18 orders more products than consumers 20 purchase, carrying costs increase for retailer 18.

Retailer 18 communicates retailer demand to distributor 16 via demand channel 22b to order products from distributor 16. Distributor 16 supplies products to retailer 18 via supply channel 24b in response to retailer demand. Supply channel 24b may include one or more processes, sites, and modes of transportation for supplying products to retailer 18. In a traditional supply chain, demand channel 22b communicates zero lead time retailer demand to distributor 16. In this case, when retailer 18 orders a product from distributor 16, the product is shipped to retailer 18 more or less immediately after distributor 16 receives the order. As a result, in a traditional supply chain, distributor 16 must have inventory in stock to meet zero lead time retailer demand. Expressed another way, distributor 16 must have inventory in stock at time t−10 to meet retailer demand at time t−10. However, retailer demand is typically unknown beforehand. As described below, the unpredictable nature of retailer demand causes distributor 16 to incur certain costs.

Distributor 16 communicates distributor demand to OEM 14 via demand channel 22b to order products from OEM 14. OEM 14 supplies products to distributor 16 via supply channel 24b in response to distributor demand. Supply channel 24b may include one or more processes, sites, and modes of transportation for supplying products to distributor 16. A delay is associated with supply channel 24b. Because of the delay, distributor 16 must order products from OEM 14 in advance to have inventory in stock by a certain date. As an example, it may take approximately twenty days to process products for shipment from OEM 14 to distributor 16, ship the products from OEM 14 to distributor 16, and process the products at distributor 16 for distribution to retailer 18. Because of the twenty day delay associated with supply channel 24b, distributor 16 must order products from OEM 14 no later than t−30 to have inventory in stock to meet retailer demand at time t−10.

Since distributor 16 must order products from OEM 14 in advance to meet retailer demand at time t−10, distributor 16 may forecast retailer demand to determine how many products to order from OEM 14 and when to order the products. As an example, at time t−30, distributor 16 may forecast that retailer demand at time t−10 will be five hundred. Because of the twenty day delay associated with supply channel 24b, distributor 16 may order five hundred products from OEM 14 at time t−30 to meet the forecasted retailer demand at time t−10. Distributor 16 may use current actual retailer demand, past actual retailer demand, or both to forecast retailer demand. However, because of the unpredictable nature of retailer demand, forecasting retailer demand is typically a difficult task. Because retailer demand is derived from consumer demand, retailer demand may be more unpredictable than consumer demand and, as a result, forecasting retailer demand may be even more difficult than forecasting consumer demand. As described below, inaccuracies in forecasted retailer demand may cause distributor 16 to incur certain costs. These inaccuracies and costs may be greater at distributor 16 than similar inaccuracies and costs at retailer 18.

Like retailer 18, to reduce the likelihood that distributor 16 will be unable to meet retailer demand if actual retailer demand exceeds forecasted retailer demand, distributor 16 may maintain safety stock in inventory. However, as a result of the unpredictable nature of retailer demand and the inaccuracies associated with forecasting retailer demand, determining safety stock levels at distributor 16 is typically a difficult task. Determining safety stock levels at distributor 16 may be more difficult than determining safety stock levels at retailer 18. As described below, inaccuracies in determining safety stock levels may cause distributor 16 to incur certain costs. These inaccuracies and costs may be greater at distributor 16 than similar inaccuracies and costs at retailer 18.

Regarding the various costs described above, distributor 16 typically loses a sale and associated profit (the marginal cost of the lost sale) if a product that retailer 18 attempts to order is not currently in inventory. Thus, distributor 16 may desire to maintain high enough inventory levels to ensure that few, if any, sales are lost. However, distributor 16 incurs carrying costs for each product kept in inventory. To reduce carrying costs, distributor 16 may attempt to accurately forecast retailer demand and order products from OEM 14 just in time to meet the forecasted retailer demand. If distributor 16 orders fewer products than retailer 18 orders, marginal costs due to lost sales increase for distributor 16. If distributor 16 orders more products than retailer 18 orders, carrying costs increase for distributor 16.

Distributor 16 communicates distributor demand to OEM 14 via demand channel 22c to order products from OEM 14. OEM 14 supplies products to distributor 16 via supply channel 24c in response to distributor demand. Supply channel 24c may include one or more processes, sites, and modes of transportation for supplying products to distributor 16. In a traditional supply chain, demand channel 22c communicates zero lead time distributor demand to OEM 14. In this case, when distributor 16 orders a product from OEM 14, the product is shipped to distributor 16 more or less immediately after OEM 14 receives the order. As a result, in a traditional supply chain, OEM 14 must have inventory in stock to meet zero lead time distributor demand. Expressed another way, OEM 14 must have inventory in stock at time t−30 to meet distributor demand at time t−30. However, distributor demand is typically unknown beforehand. As described below, the unpredictable nature of distributor demand causes OEM 14 to incur certain costs.

OEM 14 communicates OEM demand to supplier 12 via demand channel 22d to order materials from supplier 12. Supplier 12 supplies materials to OEM 14 via supply channel 24d in response to OEM demand. Supply channel 24d may include one or more processes, sites, and modes of transportation for supplying materials to OEM 14. A delay is associated with supply channel 24d. Because of the delay, OEM 14 must order materials from supplier 12 in advance to have inventory in stock by a certain date. As an example, it may take approximately thirty days to process material for shipment from supplier 12 to OEM 14, ship the material from supplier 12 to OEM 14, process the material for manufacture of products at OEM 14, and manufacture the products at OEM 14. Because of the thirty day delay associated with supply channel 24c, OEM 14 must order products from supplier 12 no later than t–60 to have inventory in stock to meet distributor demand at time t–30.

Since OEM 14 must order products from supplier 12 in advance to meet distributor demand at time t–30, OEM 14 may forecast distributor demand to determine how many products to order from supplier 12 and when to order the products. As an example, at time t–60, OEM 14 may forecast that distributor demand at time t–30 will be five hundred. Because of the thirty day delay associated with supply channel 24c, OEM 14 may order five hundred products from supplier 12 at time t–60 to meet the forecasted distributor demand at time t–30. OEM 14 may use current actual distributor demand, past actual distributor demand, or both to forecast distributor demand. However, as a result of the unpredictable nature of distributor demand, forecasting distributor demand is typically a difficult task. Because distributor demand is derived from retailer demand, distributor demand may be more unpredictable than retailer demand and, as a result, forecasting distributor demand may be even more difficult than forecasting retailer demand. As described below, inaccuracies in forecasted distributor demand may cause OEM 14 to incur certain costs. These inaccuracies and costs may be greater at OEM 14 than similar inaccuracies and costs at distributor 16.

Like retailer 18 and distributor 16, to reduce the likelihood that OEM 14 will be unable to meet distributor demand if actual distributor demand exceeds forecasted distributor demand, OEM 14 may maintain safety stock in inventory. However, as a result of the unpredictable nature of distributor demand and the inaccuracies associated with forecasting distributor demand, determining safety stock levels is typically a difficult task. Determining safety stock levels at OEM 14 may be more difficult than determining safety stock levels at distributor 16. As described below, inaccuracies in determining safety stock levels may cause OEM 14 to incur certain costs. These inaccuracies and costs may be greater at OEM 14 than similar inaccuracies and costs at distributor 16.

Regarding the various costs described above, OEM 14 typically loses a sale and associated profit (the marginal cost of the lost sale) if a product that distributor 16 attempts to order is not currently in inventory. Thus, OEM 14 may desire to maintain high enough inventory levels to ensure that few, if any, sales are lost. However, OEM 14 incurs carrying costs for each product kept in inventory. To reduce carrying costs, OEM 14 may attempt to accurately forecast distributor demand and order materials from supplier 12 just in time to meet the forecasted distributor demand. If OEM 14 manufactures fewer products than distributor 16 orders, marginal costs due to lost sales increase for OEM 14. If OEM 14 manufactures more products than distributor 16 orders, carrying costs increase for OEM 14.

OEM 14 communicates OEM demand to supplier 12 via demand channel 22d to order materials from supplier 12. Supplier 12 supplies materials to OEM 14 via supply channel 24d in response to OEM demand. In a traditional supply chain, demand channel 22d communicates zero lead time OEM demand to supplier 12. In this case, when OEM 14 orders material from supplier 12, the material is shipped to distributor 16 more or less immediately after supplier 12 receives the order. As a result, in a traditional supply chain, supplier 12 must have inventory in stock to meet zero lead time OEM demand. Expressed another way, supplier 12 must have inventory in stock at time t–60 to meet supplier 12 demand at time t–60. However, OEM demand is typically unknown beforehand. As described below, the unpredictable nature of OEM demand causes supplier 12 to incur certain costs. A delay is associated with the production of material at supplier 12. Because of the delay, supplier must begin production of materials in advance to have inventory in stock by a certain date. As an example, it may take approximately fifteen days to produce material for the manufacture of products at OEM 14. Because of the fifteen day delay associated with producing the material, OEM 14 must begin product of the material no later than t–75 to have inventory in stock to meet distributor demand at time t–60.

Since supplier 12 must begin production in advance to meet OEM demand at time t–60, supplier 12 may forecast OEM demand to determine how much material to produce and when to produce the material. As an example, at time t–75, supplier 12 may forecast that OEM demand at time t–60 will be five hundred. Because of the fifteen day delay associated with supply channel 24c, supplier 12 may begin production of five hundred at time t–75 to meet the forecasted OEM demand at time t–60. Supplier 12 may use current actual OEM demand, past actual OEM demand, or both to forecast OEM demand. However, as a result of the unpredictable nature of OEM demand, forecasting OEM demand is typically a difficult task. Because OEM demand is derived from distributor demand, OEM demand may be more unpredictable than distributor demand and, as a result, forecasting OEM demand may be even more difficult than forecasting distributor demand. As described below, inaccuracies in forecasted OEM demand may cause supplier 12 to incur certain costs. These inaccuracies and costs may be greater at supplier 12 than similar inaccuracies and costs at OEM 14.

Like retailer 18, distributor 16, and OEM 14, to reduce the likelihood that supplier 12 will be unable to meet OEM demand if actual OEM demand exceeds forecasted OEM demand, supplier 12 may maintain safety stock in inventory. However, as a result of the unpredictable nature of OEM demand and the inaccuracies associated with forecasting OEM demand, determining safety stock levels is typically a difficult task. Determining safety stock levels at supplier 12 may be more difficult than determining safety stock levels at OEM 14. As described below, inaccuracies in determining safety stock levels may cause supplier 12 to incur certain costs. These inaccuracies and costs may be greater at supplier 12 than similar inaccuracies and costs at OEM 14.

Regarding the various costs described above, supplier 12 typically loses a sale and associated profit (the marginal cost of the lost sale) if material that OEM 16 attempts to order is not currently in inventory. Thus, supplier 12 may desire to maintain high enough inventory levels to ensure that few, if any, sales are lost. However, supplier 12 incurs carrying costs for material kept in inventory. To reduce carrying costs, supplier 12 may attempt to accurately forecast OEM demand and produce material just in time to meet the forecasted OEM demand. If supplier 12 produces less material than OEM 16 orders, marginal costs due to lost sales increase for supplier 12. If supplier 12 produces more material than OEM 16 orders, carrying costs increase for supplier 12.

However, there may be one or more variations in the above processes. As an example, distributor 16 may place one or two weeks' worth of orders at OEM 14 at one time. As another example, OEM 14 may place one or two weeks' worth of orders at supplier 12 at one time. In addition, there may be one or more contracts between two supply chain entities that are adjacent each other in the supply chain. These contracts may facilitate efficient management of supply and demand and may govern purchasing volume, purchasing period, inventory levels, etc.

As described above, in a traditional supply chain, when a consumer 20 purchases a product from retailer 18, consumer 20 receives the product more or less immediately after the purchase. In contrast, according to the present invention, consumer 20 may indicate a desire to receive the product at a later date in exchange for a price discount or another suitable incentive. Consumer 20 may indicate such a desire by purchasing the product for pick-up or delivery at the later date, by agreeing or otherwise committing to purchase the product at the later date, by expressing an intention to purchase the product on the later date, or in any other suitable manner. In particular embodiments, the incentive offered may correspond to the lead time that consumer 20 chooses. In addition or as an alternative, the incentive offered may correspond to one or more current sales plans, one or more actuals, and one or more inventories in the value chain. "Lead time" refers to the number of days after the indication of desire that consumer 20 will receive the product. As a single example, retailer 18 may offer a ten percent discount to consumer 20 to choose to a ten day lead time, a twenty percent discount to choose a thirty day lead time, and a thirty percent discount to choose a sixty day lead time. As a more complex example, retailer 18 may base the incentive corresponding to a lead time on the costs that will be saved within the supply chain as a result of the lead time, as described below. An incentive to a consumer 20 to choose to receive a product at a later date may be determined according to one or more business rules, as described below.

If consumer 20 chooses to receive the product at a later date in exchange for the incentive, then retailer 18 may require consumer 20 to make full payment to retailer 18 at the time of the indication. Alternatively, retailer 18 may require consumer 20 to make an initial payment to retailer 18 at the time of the indication, with the balance to be paid or other payment arrangements to be made before the product is received. Retailer 18 may similarly require consumer 20 to make one or more interim payments. If consumer 20 does not pay the balance or make other payment arrangements for the purchase by the appropriate date, then retailer 18 may keep the initial payment and cancel the transaction between retailer 18 and consumer 20. Retailer 18 may also keep one or more interim payments, where applicable. The initial payment and any interim payments may be determined according to one or more business rules, as described below.

If consumer 20 chooses to receive the product at a later date in exchange for the incentive, retailer 18 may communicate the lead time order to distributor 16 or OEM 14 depending on the corresponding lead time. "Lead time order" refers to an order for a product that a consumer 20 has chosen to receive at a later date (instead of more or less immediately after the purchase). In particular embodiments, retailer 18 may communicate the lead time order to distributor 16 or OEM 14 more or less immediately after the purchase. In particular embodiments, retailer 18 may periodically communicate batches of lead time orders to distributor 16 or OEM 14, such as once each day for example, according to particular needs. Retailer 18 communicates lead time orders to distributor 16 via demand channel 22e. Although demand channels 22b and 22e are illustrated and described as being separate from each other, the present invention also contemplates demand channels 22b and 22e being the same or being combined with each other. Retailer 18 communicates lead time orders to OEM 14 via demand channel 22f.

In particular embodiments, retailer 18 communicates to distributor 16 lead time orders with lead times that are greater than or equal to the delay associated with supply channel 24b and less than the combined delay associated with supply channels 24b and 24c. As an example, if a delay of ten days is associated with supply channel 24c and a delay of twenty days is associated with supply channel 24b, retailer 18 may communicate lead time orders with lead times of at least ten days, but less than thirty days, to distributor 16. Retailer 18 communicates lead time orders to OEM 14 via demand channel 22e. Distributor 16 supplies products to retailer 18 or directly to consumers 20 in response to the lead time orders. Retailer 18 need not carry those products in inventory and, as a result, may avoid one or more carrying costs associated with those products. In addition, if distributor 16 supplies the products directly to consumers 20, retailer 18 may avoid one or more shipping costs associated with the products. As described below, retailer 18 may keep a portion of these savings (which may increase retailer profit on those products) and provide the remainder to consumers 20 as incentives to receive products at later dates.

In particular embodiments, retailer 18 communicates to OEM 14 lead time orders with lead times that are greater than or equal to the combined delay associated with supply channels 24b and 24c. As an example, if a delay of ten days is associated with supply channel 24b and a delay of twenty days is associated with supply channel 24c, then retailer 18 may communicate lead time orders with lead times of thirty or more days to OEM 14. Retailer 18 communicates lead time orders to OEM 14 via demand channel 22f. OEM 14 supplies products to retailer 18 through distributor 16 or directly to consumers 20 in response to the lead time orders. Retailer 18 and distributor 16 need not carry those products in inventory. As a result, retailer 18 and distributor 16 may avoid one or more carrying costs associated with those products. In addition, if OEM 14 supplies the products directly to consumers 20, retailer 18 and distributor 16 may avoid one or more shipping costs associated with the products. As described below, retailer 18 may keep a first portion of these savings (which may increase retailer profit on those products), provide a second portion of these savings to distributor 16 (which may increase distributor profit on those products), and provide the remainder to consumers 20 as incentives to receive products at later dates. Alternatively, if OEM 14 supplies the products directly to consumers 20, retailer 18 may keep a portion of the savings and provide the remainder to consumers 20, since distributor 16 is not involved in supplying the products.

In particular embodiments, OEM 14 communicates to supplier 12 lead time orders (that OEM 14 has received from retailer 18) with lead times that are greater than or equal to the combined delay associated with supply channels 24b, 24c, and 24d. As an example, if delays of ten, twenty, and thirty days are associated with supply channels 24b, 24c, and 24d, respectively, then retailer 18 may communicate lead time orders with lead times of sixty or more days to supplier 12. OEM 14 may communicate lead time orders to supplier 12 via demand channel 22d or another demand channel 22 between OEM 14 and supplier 12, according to particular needs. Supplier 12 supplies materials to OEM 14 in response to the lead time orders, and OEM 14 uses the materials to manufacture products to fill the lead time orders. OEM 14 need not carry those materials in inventory, and retailer 18 and distributor 16 need not carry those products in inventory. As a result, OEM 14 may avoid one or more carrying costs associated with those materials and retailer 18 and distributor 16 may avoid one or more carrying costs associated with those products. In addition, if OEM 14 supplies the products directly to consumers 20, retailer 18 and distributor 16 may avoid one or more shipping costs associated with the products. As described below, retailer 18 may keep a first portion of these savings (which may increase retailer profit on those products), provide a second portion of these savings to distributor 16 (which may increase distributor profit on those products), provide a third portion of these savings to OEM 14 (which may increase OEM profit on those products), and provide the remainder to consumers 20 as incentives to receive products at later dates. Alternatively, if OEM 14 supplies the products directly to consumers 20, retailer 18 and OEM 14 may each keep a portion of the savings and provide the remainder to consumers 20, since distributor 16 is not involved in supplying the products.

Lead time orders communicated via demand channel 22*e* may provide an indication of future regular retailer demand to distributor 16. As an example, at time t, five hundred consumers 20 each choose to receive a product at time t+10 in exchange for a corresponding incentive. Retailer 18 communicates the lead time orders to distributor 16 via demand channel 22*e*. As a result, demand channel 22*e* communicates a time t consumer demand of five hundred to distributor 16. Since consumers 20 will receive their products at time t+10, this consumer demand may, in particular embodiments, be considered a time t+10 consumer demand. In particular embodiments, distributor 16 may use this information in one or more forecast cycles to forecast regular retailer demand. Distributor 16 may determine a historical or other correlation between consumer demand communicated via demand channel 22*e* and regular retailer demand communicated via demand channel 22*b* and use the determined historical or other correlation to forecast regular retailer demand. The use of consumer demand to forecast regular retailer demand may enable distributor 16 to more accurately forecast regular retailer demand, which may reduce carrying costs at distributor 16.

Lead time orders communicated via demand channel 22*f* may provide an indication of future regular distributor demand to OEM 14. As an example, at time t five hundred consumers 20 each choose to receive a product at time t+30 in exchange for a corresponding incentive. Retailer 18 communicates the lead time orders to OEM 14 via demand channel 22*f*. As a result, demand channel 22*f* communicates a time t consumer demand of five hundred to OEM 14. Since consumers 20 will receive their products at time t+30, this consumer demand may, in particular embodiments, be considered a time t+30 consumer demand. In particular embodiments, OEM 14 may use this information in one or more forecast cycles to forecast regular distributor demand. OEM 14 may determine a historical or other correlation between consumer demand communicated via demand channel 22*f* and regular distributor demand communicated via demand channel 22*c* and use the determined historical or other correlation to forecast regular distributor demand. The use of consumer demand to forecast regular distributor demand may enable OEM 14 to more accurately forecast regular distributor demand, which may reduce carrying costs at OEM 14.

Lead time orders communicated to supplier 12 may provide supplier 12 an indication of future regular OEM demand. As an example, at time t five hundred consumers 20 each choose to receive a product at time t+60 in exchange for a corresponding incentive. Retailer 18 communicates the lead time orders to OEM 14 via demand channel 22*f*, and OEM 14 communicates the lead time orders to supplier 12. As a result, supplier 12 may receive a time t consumer demand of five hundred. Since consumers 20 will receive their products at time t+60, this consumer demand may, in particular embodiments, be considered a time t+60 consumer demand. In particular embodiments, supplier 12 may use this information in one or more forecast cycles to forecast regular OEM demand. Supplier 12 may determine a historical or other correlation between consumer demand communicated to supplier 12 and OEM demand communicated via demand channel 22*d* and use the determined historical or other correlation to forecast regular OEM demand. The use of consumer demand to forecast OEM demand may enable supplier 12 to more accurately forecast distributor demand, which may reduce carrying costs at supplier 12.

In particular embodiments, as a result of allowing improved demand forecasting, lead time orders may reduce safety stock requirements at one or more of supplier 12, OEM 14, distributor 16, and retailer 18. As an example, at time t−20, retailer 18 forecasts that five hundred consumers 20 will choose to receive a product from retailer 18 at time t. In addition, retailer 18 forecasts that three hundred of these consumers 20 will choose to receive the product more or less immediately after the purchase in a traditional manner and the other two hundred consumers 20 will choose to receive the product at time t+20 in exchange for a corresponding incentive according to the present invention. Therefore, to meet the forecasted consumer demand at time t+20, retailer 18 needs to maintain safety stock for demand of three hundred products (instead of five hundred) at time t+20. As a result, retailer 18 need have as safety stock a percentage of only three hundred products (instead of five hundred). For example, where retailer 18 keeps an additional 10% of inventory as safety stock, this reduces inventory by twenty (0.10*500−0.10*300=20).

In particular embodiments, to fill a lead time order, distributor 16 may supply a product directly to a consumer 20 via supply channel 24*e*. Supply channel 24*e* may include one or more processes and modes of transportation that effect shipment of products from distributor 16 directly to consumers 20. Supply channel 24*e* bypasses retailer 18 and, as a result, may reduce or even eliminate costs associated with supply channels 24*b* and 24*a* and carrying costs at retailer 18. As an alternative, distributor 16 may supply the product to consumer 20 through retailer 18 via supply channels 24*b* and 24*a*. Although supplying the product to consumer 20 through retailer 18 via supply channels 24*b* and 24*a* does not reduce or eliminate costs associated with supply channels 24*b* and 24*a*, supplying the product to consumer 20 through retailer 18 via supply channels 24*b* and 24*a* eliminates carrying costs associated with the product at retailer 18.

Similarly, in particular embodiments, to fill a lead time order, OEM 14 supplies a product directly to consumer 20 via supply channel 24*f*. Supply channel 24*f* may include one or more processes and modes of transportation that effect shipment of products from OEM 14 directly to consumers 20. Supply channel 24*f* bypasses distributor 16 and retailer 18 and, as a result, may reduce or even eliminate costs associated with supply channels 24*c*, 24*b*, and 24*a* and carrying costs at distributor 16 and retailer 18. As an alternative, OEM 14 may supply the product to consumer 20 through distributor 16 and retailer 18 via supply channels 24*c*, 24*b*, and 24*a*. Although supplying the product to consumer 20 through distributor 16 and retailer 18 via supply channels 24*c*, 24*b*, and 24*a* does not reduce or eliminate costs associated with supply channels 24*c*, 24*b*, and 24*a*, supplying the product to consumer 20 through distributor 16 and retailer 18 via supply channels 24*c*, 24*b*, and 24*a* eliminates carrying costs associated with the product at distributor 16 and retailer 18.

Similarly, to fill a lead time order, supplier 12 may supply material to OEM 14 via supply channel 24d. OEM 14 may use the material to manufacture a product and supply the product directly to a consumer via supply channel 24f or through distributor 16 and retailer 18 via supply channels 24c, 24b, and 24a. Although supplier 12 must supply the material to OEM 14, if the lead time is longer than the combined delay associated with the supply channel from its suppliers, supplier 12 may be able to reduce or even eliminate carrying costs associated with the consumer demand that is translated and sent to supplier 12 from OEM 14.

Figure 2:
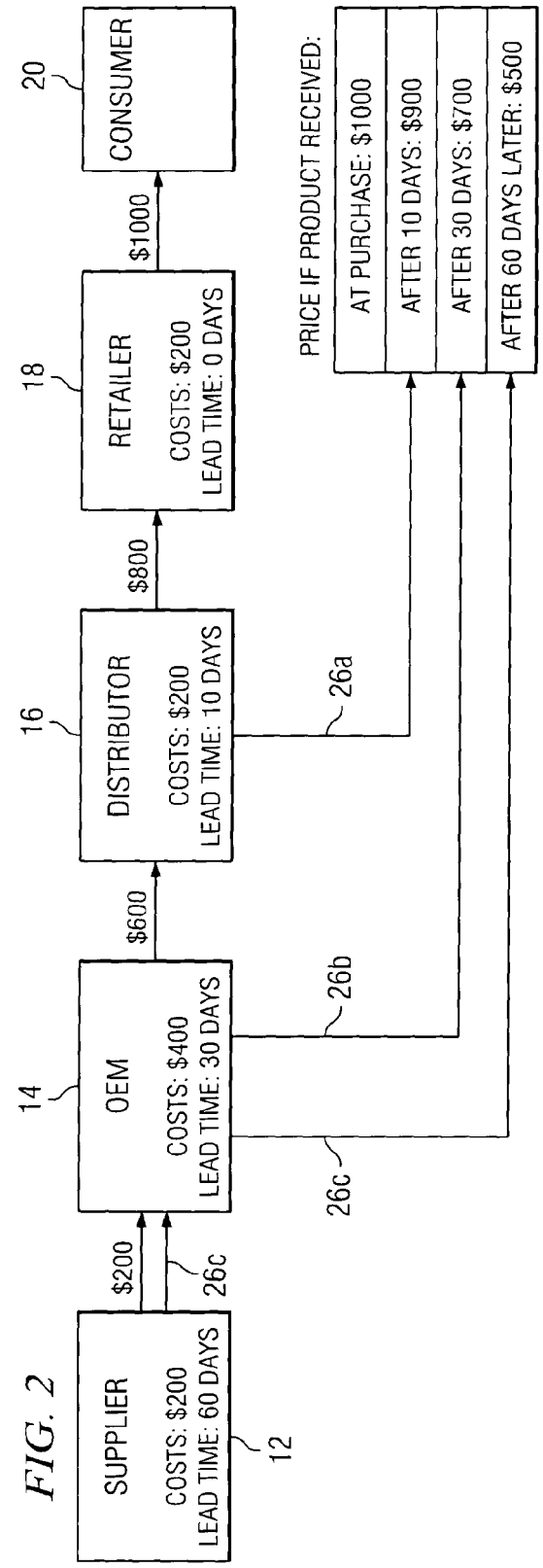
FIG. 2 illustrates costs and lead times in an example system for distributing consumer demand upstream in a supply chain.

FIG. 2 illustrates costs and lead times in an example system for distributing consumer demand upstream in a supply chain. In scenario 26a, the price is $900, but the product will be delivered to consumer 20 in ten days. Retailer 18 can purchase the product at $800 and deliver the product to consumer for $900. Retailer 18 may own the shipping and service or share with the distributor and/or a 3PL (third party logistics provider). There is value for retailer 18 and consumer 20. Retailer 18 can incent distributor 16 for adopting this model by paying more than $800. In scenario 26b, the price is $700, but the product will be delivered to consumer 20 in thirty days. Retailer 18 can directly place the order at OEM 14 for OEM 14 to manufacture the product. This follows elimination of redundant physical flows (e.g., products now do not have to go through distributor warehouses, retailer warehouses, and stores). There is value for OEM 14, retailer 18, and consumer 20. Retailer 18 can incent OEM 14 for rapid adoption by paying more than $600. In scenario 26c, the price is $500, but the product will be delivered to consumer 20 in sixty days. Retailer 18 can directly place the order at OEM 14. OEM 14 will place orders directly at supplier 12. OEM 14 owns the product manufacturing and quality, while retailer 18 could own the shipping and service (all the participants can outsource where deemed profitable). There is value for supplier 12, OEM 14, retailer 18, and consumer 20. Everyone receives firm orders and gets incentives. In particular embodiments, every entity in the value chain would get value, including consumer 20. Assuming that 35% of orders come through the mechanism, 35% of the inefficiencies can be straight away eliminated. The remaining 65% of the inefficiencies can be reduced by employing velocity concepts. In this model, firm consumer orders are placed at appropriate entities in the value chain and products are pulled from the appropriate entities to fill the firm consumer orders.

Figure 3:
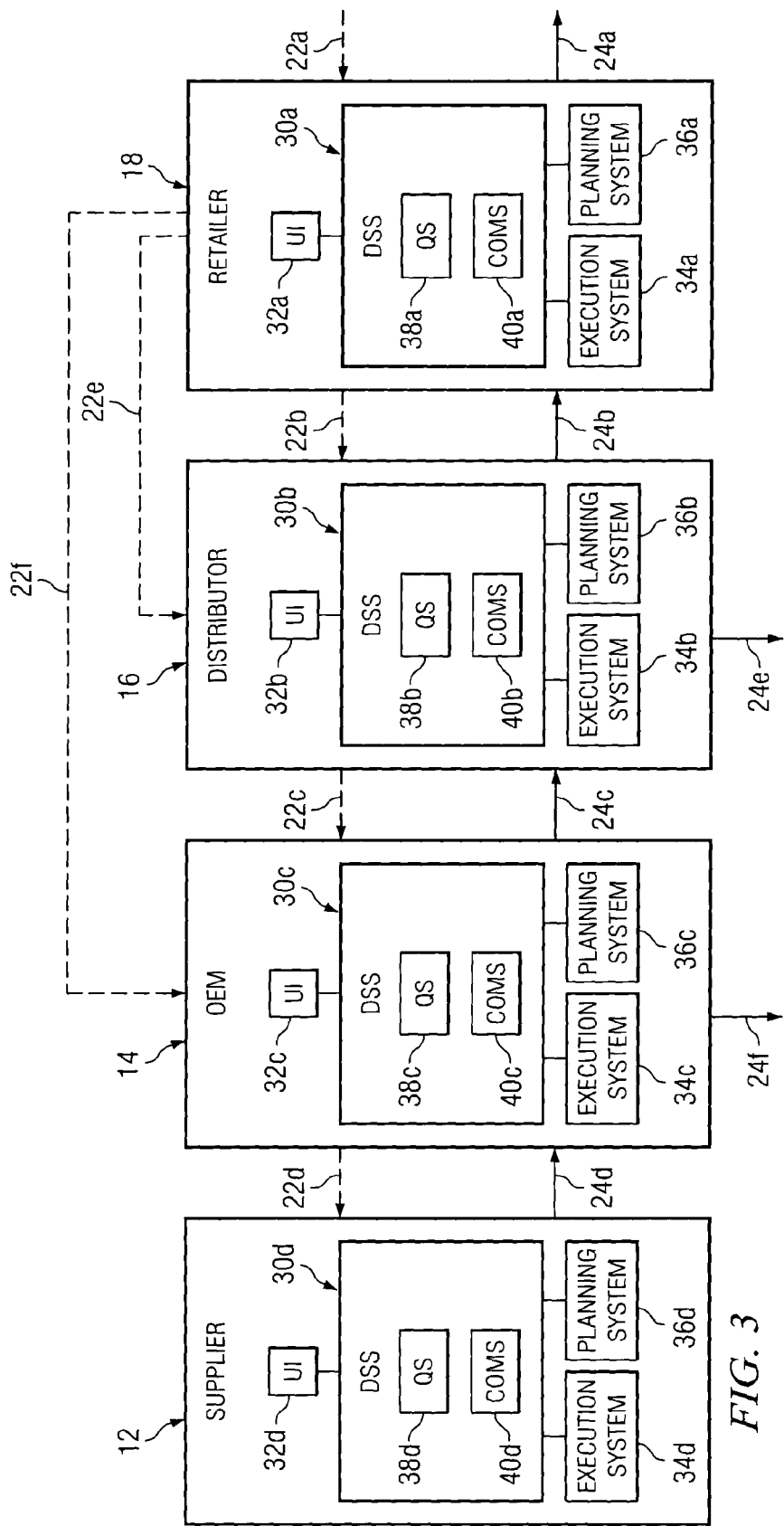
FIG. 3 illustrates, in greater detail, an example system for distributing consumer demand upstream in a supply chain.

FIG. 3 illustrates, in greater detail, example system 10. In particular embodiments, supplier 12, OEM 14, distributor 16, and retailer 18 may each include a demand shaping system (DSS) 30 with a user interface 32, one or more execution systems 34, and one or more planning systems 36. An execution system 34 may include one or more order management systems (OMSs), warehouses, and modes of transportation. An execution system 34 may include one or more demand planning or other supply chain planning systems. A DSS 30 may include one or more computer systems associated with a supply chain entity at one or more locations. A DSS 30 may include one or more quote systems 38 and one or more consumer order management systems (COMSs) 40. A COMS 40 may include one or more computer systems that collectively handle shipment processing. As described above, shipment processing may include determining how and according to what schedule one or more items will be shipped, selecting one or more sites the items will be shipped from and one or more sites the items will be shipped to, and other shipment processing. In particular embodiments, a COMS 40 may attempt to optimize shipment to reduce shipment costs.

Functionality associated with COMS 40 may handle shipment processing for shipment directly to consumers 20. In particular embodiments, this functionality may be incorporated into an existing OMS at supplier 12, OEM 14, distributor 16, or retailer 18 or may be provided by another system coupled to an existing OMS or by a new OMS. A COMS 40 may also communicate lead time orders to one or more other COMSs 40. As an example, COMS 40a at retailer 18 may communicate to COMS 40b at distributor 16 lead time orders that have lead times greater than or equal to a delay associated with supply channel 24b and less than a combined delay associated with supply channels 24b and 24c, as described above. As another example, COMS 40a at retailer 18 may communicate to COMS 40c at OEM 14 lead time orders that have lead times greater than or equal to a combined delay associated with supply channels 24b and 24c, as described above.

Quote system 38a at retailer 18 may use one or more business rules to determine an incentive to offer to a consumer 20 to choose to receive a product at a later date. In addition or as an alternative, quote system 38a may use one or more business rules to determine an initial payment and applicable interim payments. A business rule may include a parameter associated with one or more processes (and one or more costs associated with the processes) at retailer 18. In particular embodiments, to determine the incentive, quote system 38a may use one or more business rules to determine how much less it would cost to supply the product to consumer 20 at the later date than to supply the product to consumer 20 more or less immediately after purchase. Quote system 38a may then allocate a first portion of the cost savings to retailer 18 as increased profit margin and a second portion of the cost savings to consumer 20 as an incentive to consumer 20 to choose to receive the product at the later date. As an example, if quote system 38a determines that it would cost $300 less to supply the product to consumer 20 at the later date, quote system 38a may allocate $175 to retailer 18 as increased profit margin and $125 to consumer 20 as a discount for choosing to receive the product at the later date.

In particular embodiments, if consumer 20 chooses a lead time that is greater that a delay associated with supply channel 24b and less than a combined delay associated with supply channels 24b and 24c, quote system 38a at retailer 18 may communicate with quote system 38b at distributor 16 to determine how much less it would cost to supply the product to consumer 20 at the later date. As an example, if supply channels 24b and 24c have delays of ten and twenty days, respectively, and consumer 20 chooses to receive the product twenty days after consumer 20 purchases the product, distributor 16 may incur less cost as a result of the ten-day advance notice on the order. Quote system 38a may communicate with quote system 38b to determine the reduced cost at distributor 16 and allocate a portion of the cost savings at distributor 16 to consumer 20 as an additional incentive to consumer 20 to choose to receive the product at the later date.

In particular embodiments, if consumer 20 chooses a lead time that is greater than a combined delay associated with supply channels 24b and 24c, quote system 38a at retailer 18 may communicate with quote system 38c at OEM 14 to determine how much less it would cost to supply the product to consumer 20 at the later date. As an example, if supply channels 24b and 24c have a combined delay of thirty days and consumer 20 chooses to receive the product forty days after consumer 20 purchases the product, OEM 14 may incur less cost as a result of the ten-day advance notice on the order. Quote system 38a may communicate with quote system 38c to determine the reduced cost at OEM 14 and allocate a portion of the cost savings at OEM 14 to consumer 20 as an additional incentive to consumer 20 to choose to receive the product at the later date. Quote system 38*a* may similarly communicate with quote system 38*d*, according to particular needs.

In particular embodiments, quote system 38*a* uses one or more business rules to determine an initial payment from a consumer 20. An initial payment may tend to offset one or more costs associated with lead time order cancellation. As an example, if retailer 18 would incur a $100 loss (as a result of shipping, carrying, or other costs) if consumer 20 cancelled the lead time order, retailer 18 may require consumer 20 to make an initial payment of $100 when consumer 20 purchases the product. In particular embodiments, if consumer 20 cancels the lead time order within a certain amount of time after the purchase, retailer 18 may return a portion of the initial payment to consumer 20. The returned portion of the initial payment may be determined according to shipping, carrying, or other costs avoided as a result of the early cancellation. If one or more of distributor 16, OEM 14, or supplier would also incur losses if consumer 20 cancelled the lead time order, quote system 38*a* may communicate with one or more of quote systems 38*b*, 32*c*, and 32*d* to determine those potential losses and may increase the initial payment to cover those losses also.

Figure 4:
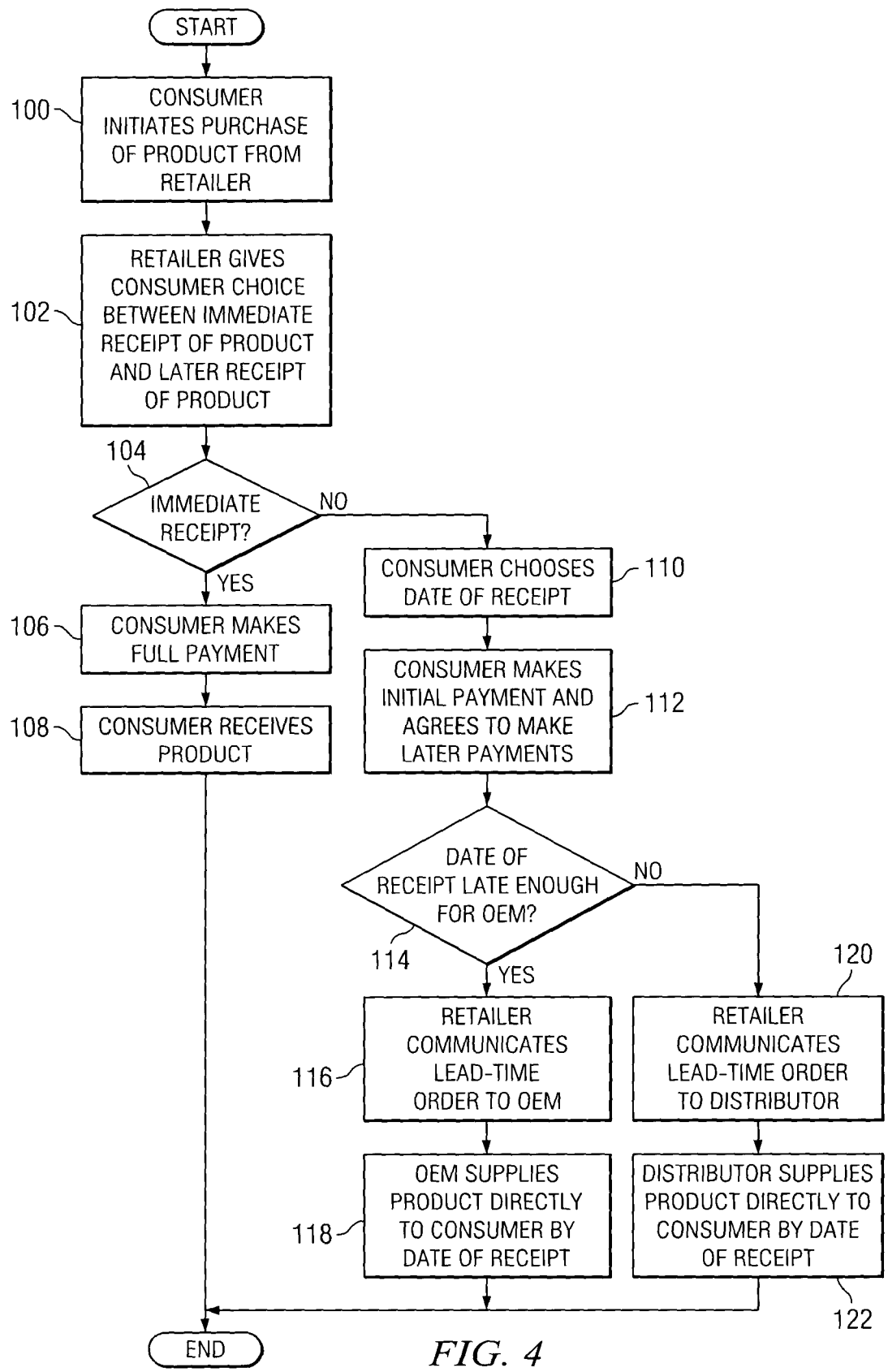
FIG. 4 illustrates an example method for distributing consumer demand upstream in a supply chain.

FIG. 4 illustrates an example method for distributing consumer demand upstream in a supply chain. The method begins at step 100, where a consumer 20 initiates a purchase of a product from retailer 18. At step 102, retailer 18 allows consumer 20 to choose to receive the product more or less immediately after the purchase or at one of one or more later dates. As described above, retailer 18 may offer consumer 20 one or more incentives to choose to receive the product at one of one or more later dates. The incentives may, in particular embodiments, be determined according to one or more business rules at one or more of retailer 18, distributor 16, OEM 14, and supplier 12. At step 104, if consumer 20 chooses to receive the product more or less immediately after the purchase, the method proceeds to step 106. At step 106, consumer 20 makes full payment to retailer 18. At step 108, consumer receives the product more or less immediately after the purchase, at which point the method ends.

Returning to step 104, if consumer 20 chooses to receive the product at a later date, the method proceeds to step 110. At step 110, consumer 20 chooses a date to receive the product. At step 112, consumer 20 makes an initial payment and agrees to make one or more later payments. As described above, the initial payment may be determined according to one or more business rules at one or more of retailer 18, distributor 16, OEM 14, and supplier 12 and may tend to offset one or more costs associated with lead time order cancellation. At step 114, if consumer 20 chose a lead time greater than or equal to a combined delay associated with supply channels 24*b* and 24*c*, the method proceeds to step 116. At step 116, retailer 18 communicates the lead time order to OEM 14. As described above, if consumer 20 chose a lead time greater than a combined delay associated with supply channels 24*b*, 24*c*, and 24*d*, OEM 14 may communicate the lead time order to supplier 12. At step 118, OEM 14 supplies the product directly to consumer 20 via supply channel 24*e* by the date of receipt chosen by consumer 20, at which point the method ends. As an alternative, in particular embodiments, OEM 14 may supply the product to consumer 20 via supply channel 24*b*.

Returning to step 114, if consumer 20 chose a lead time greater than or equal to a delay associated with supply channel 24*c* and less than the combined delay associated with supply channels 24*b* and 24*c*, the method proceeds to step 120. At step 120, retailer 18 communicates the lead time order to distributor 16. At step 122, distributor 16 supplies the product directly to consumer 20 via supply channel 24*f* by the date of receipt chosen by consumer 20, at which point the method ends. As an alternative, in particular embodiments, distributor 16 may supply the product to consumer 20 via supply channel 24*c*. Although particular steps of the example method illustrated in FIG. 4 are illustrated and described as occurring in a particular order, the present invention contemplates any suitable steps of the method described above occurring in any suitable order.

Although the present invention has been described with several embodiments, myriad changes, variations, alterations, transformations, and modifications may be suggested to one skilled in the art, and it is intended that the present invention encompass such changes, variations, alterations, transformations, and modifications as fall within the scope of the appended claims. The present invention is not intended to be limited, in any way, by any statement in the specification that is not reflected in the claims.

What is claimed is:

1. A system of distributing consumer demand upstream in a supply chain, comprising:
one or more computer systems comprising one or more processors, the one or more computer systems comprising:
a user interface configured to receive, on a current date, an indication of consumer demand for a product that a consumer associated with a consumer computer system is willing to receive at a date after the current date, rather than the current date, in exchange for an incentive, and communicate the indication of consumer demand for the product to a quote system coupled with the user interface and the consumer computer system,
the quote system configured to:
receive, from the user interface, the indication of consumer demand for the product and determine a first incentive based on a first order lead time for the product, the first order lead time for the product representing a time difference between a first future date of a proposed delivery and the current date, the first order lead time is longer than a first supply channel delay between a downstream supply chain entity and a first upstream supply chain entity, and the first incentive is based at least partially on a cost savings to the downstream supply chain entity associated with the first order lead time;
determine a second incentive larger than the first incentive and based on a second order lead time for the product, the second order lead time for the product representing a time difference between a second future date and the current date, the second order lead time is longer than a second supply channel delay between the downstream supply chain entity and a second upstream supply chain entity, the second incentive reflecting collective cost savings to the downstream supply chain entity and the first upstream supply chain entity associated with the second order lead time;
determine a third incentive larger than the first incentive and the second incentive based on a third order lead time for the product, the third order lead time for the product representing a time difference between a third future date and the current date, the third order lead time is longer than a third supply channel delay between the downstream supply chain entity and a third upstream supply chain entity, the third incentive reflecting collective cost savings to the downstream supply chain entity and the second upstream supply chain entity associated with the third order lead time; and communicate the first, second and third incentives to the consumer computer system, wherein the consumer computer system is further configured to determine whether to receive the product at the first, second or third future date rather than the current date in exchange for the first, second or third incentive; and a consumer order management system configured to communicate a consumer order for the product to one of the first, second and third upstream supply chain entities such that, when the order is successfully processed by one of the first, second and third upstream supply chain entities respectively, the consumer receives the product at one of the first, second and third future dates from current inventory of one of the first, second and third upstream supply chain entities rather than from current inventory of the downstream supply chain entity in exchange for one of the first, second and third incentives respectively.

2. The system of claim 1, wherein at least one of the first, second and third incentives comprises a price discount on the product.

3. The system of claim 1, wherein the quote system is a first quote system and is further configured to:
collaborate with a second quote system associated with the first upstream supply chain entity to determine a cost at the first upstream supply chain entity associated with the consumer receiving the product from the current inventory of the first upstream supply chain entity;
determine a profit increase on the product at the downstream supply chain entity based on:
the cost at the first upstream supply chain entity associated with supplying the product from the current inventory of the first upstream supply chain entity; and
the cost savings to the downstream supply chain entity associated with the first order lead time; and
determine the first incentive based on the profit increase.

4. The system of claim 1, wherein the quote system is a first quote system and is further configured to collaborate with a second quote system associated with the first upstream supply chain entity to determine the incentive based on one or more business rules associated with one or more of the downstream and first upstream supply chain entities.

5. The system of claim 1, wherein the quote system is a first quote system and is further configured to:
collaborate with a second quote system associated with the second upstream supply chain entity to determine a cost at the second upstream supply chain entity associated with the consumer receiving the product from the current inventory of the second upstream supply chain entity;
determine a profit increase on the product at the downstream supply chain entity based on:
the cost at the second upstream supply chain entity associated with supplying the product from the current inventory of the second upstream supply chain entity; and
the cost savings to the downstream supply chain entity associated with the second order lead time; and
determine the second incentive based on the profit increase.

6. The system of claim 1, wherein the quote system is a first quote system and is further configured to collaborate with one or both of a second quote system associated with the first upstream supply chain entity and with a third quote system associated with the second upstream supply chain entity to determine the second incentive based on one or more business rules associated with one or more of the downstream and first and second upstream supply chain entities.

7. The system of claim 1, wherein the consumer receiving the product at one of the first, second and third future dates rather than the current date in exchange for one of the first, second and third incentives comprises one of:
a consumer purchasing the product via the consumer computer system at the current date;
a consumer committing at the current date to purchase the product via the consumer computer system at one of the first, second and third future dates; and
a consumer indicating an intention via the consumer computer system at the current date to purchase the product at one of the first, second and third future dates.

8. The system of claim 1, wherein the consumer receiving the product at one of the first, second and third future dates comprises one of:
a consumer visiting the downstream supply chain entity at one of the first, second and third future dates to pick up the product;
the downstream supply chain entity delivering the product at one of the first, second and third future dates; and
one of the first, second and third upstream supply chain entities delivering the product at one of the first, second and third future dates.

9. The system of claim 1, wherein the quote system is further configured to determine an initial payment and one or more interim payments due prior to the consumer receiving the product.

10. A computer-implemented method of distributing consumer demand upstream in a supply chain, comprising:
receiving, by a computer, on a current date, a consumer demand for a product to be received at a date after the current date:
determining, by the computer, a first incentive based on a first order lead time for the product, the first order lead time for the product representing a time difference between a first future date of a proposed delivery and the current date, the first order lead time is longer than a first supply channel delay between [[the]] a downstream supply chain entity and a first upstream supply chain entity, and the first incentive is based at least partially on a cost savings to the downstream supply chain entity associated with the first order lead time;
determining, by the computer, a second incentive larger than the first incentive and based on a second order lead time for the product, the second order lead time for the product representing a time difference between a second future date and the current date, the second order lead time is longer than a second supply channel delay between the downstream supply chain entity and a second upstream supply chain entity, the second incentive reflecting collective cost savings to the downstream supply chain entity and the first upstream supply chain entity associated with the second order lead time;
determining, by the computer, a third incentive larger than the first incentive and the second incentive based on a third order lead time for the product, the third order lead time for the product representing a time difference between a third future date and the current date, the third order lead time is longer than a third supply channel delay between the downstream supply chain entity and a third upstream supply chain entity, the third incentive reflecting collective cost savings to the downstream supply chain entity and the second upstream supply chain entity associated with the third order lead time;

communicating, by the computer, the first, second and third incentives to a consumer computer system associated with a consumer, wherein the consumer computer system determines whether to receive the product at the first, second or third future date rather than the current date in exchange for the first, second or third incentive; and communicating, by the computer, an order for the product to one of the first, second and third upstream supply chain entities such that, when the order is successfully processed by one of the first, second and third upstream supply chain entities respectively, the consumer receives the product at one of the first, second and third future dates from current inventory of one of the first, second and third upstream supply chain entities rather than from current inventory of the downstream supply chain entity in exchange for one of the first, second and third incentives respectively.

11. The method of claim 10, wherein at least one of the first, second and third incentives comprises a price discount on the product.

12. The method of claim 10, comprising:
collaborating with the first upstream supply chain entity to determine a cost at the first upstream supply chain entity associated with the consumer receiving the product from the current inventory of the first upstream supply chain entity;
determining a profit increase on the product at the downstream supply chain entity based on:
the cost at the first upstream supply chain entity associated with supplying the product from the current inventory of the first upstream supply chain entity; and
the cost savings to the downstream supply chain entity associated with the first order lead time; and
determining the first incentive based on the profit increase.

13. The method of claim 10, comprising collaborating with the first upstream supply chain entity to determine the incentive based on one or more business rules associated with one or more of the downstream and first upstream supply chain entities.

14. The method of claim 10, comprising:
collaborating with the second upstream supply chain entity to determine a cost at the second upstream supply chain entity associated with the consumer receiving the product from the current inventory of the second upstream supply chain entity;
determining a profit increase on the product at the downstream supply chain entity based on:
the cost at the second upstream supply chain entity associated with supplying the product from the current inventory of the second upstream supply chain entity; and
the cost savings to the downstream supply chain entity associated with the second order lead time; and
determining the second incentive based on the profit increase.

15. The method of claim 10, comprising collaborating with one or both of the first and second upstream supply chain entities to determine the second incentive based on one or more business rules associated with one or more of the downstream and first and second upstream supply chain entities.

16. The method of claim 10, wherein the consumer receiving the product at one of the first, second and third future dates rather than the current date in exchange for one of the first, second and third incentives comprises one of:
a consumer purchasing the product via a consumer computer system at the current date;
a consumer committing at the current date to purchase the product via the consumer computer system at one of the first, second and third future dates; and
a consumer indicating an intention via the consumer computer system at the current date to purchase the product at one of the first, second and third future dates.

17. The method of claim 10, wherein the consumer receiving the product at one of the first, second and third future dates comprises one of:
a consumer visiting the downstream supply chain entity at one of the first, second and third future dates to pick up the product;
the downstream supply chain entity delivering the product at one of the first, second and third future dates; and
one of the first, second and third upstream supply chain entities delivering the product at one of the first, second and third future dates.

18. The method of claim 10, wherein, when the consumer chooses to receive the product at the first future date in exchange for the first incentive, the first upstream supply chain entity receives an initial payment at the current date based on one or more costs to the downstream supply chain entity associated with cancellation of the order.

19. A non-transitory computer-readable media embodied with software for distributing consumer demand upstream in a supply chain, the software when executed using one or more computers is configured to:
receive, a consumer demand for a product to receive at a date after the current date, rather than the current date;
determine a first incentive based on a first order lead time for the product, the first order lead time for the product representing a time difference between a first future date of a proposed delivery and the current date, the first order lead time is longer than a first supply channel delay between the downstream supply chain entity and a first upstream supply chain entity, and the first incentive is based at least partially on a cost savings to the downstream supply chain entity associated with the first order lead time;
determine a second incentive larger than the first incentive and based on a second order lead time for the product, the second order lead time for the product representing a time difference between a second future date and the current date, the second order lead time is longer than a second supply channel delay between the downstream supply chain entity and a second upstream supply chain entity, the second incentive reflecting collective cost savings to the downstream supply chain entity and the first upstream supply chain entity associated with the second order lead time;
determine a third incentive larger than the first incentive and the second incentive based on a third order lead time for the product, the third order lead time for the product representing a time difference between a third future date and the current date, the third order lead time is longer than a third supply channel delay between the downstream supply chain entity and a third upstream supply chain entity, the third incentive reflecting collective cost savings to the downstream supply chain entity and the second upstream supply chain entity associated with the second order lead time;

communicate the first, second and third incentives to a consumer computer system associated with a consumer, wherein the consumer computer system determines whether to receive the product at the first, second or third future date rather than the current date in exchange for the first, second or third incentive; and communicate an order for the product to one of the first, second and third upstream supply chain entities such that, when the order is successfully processed by one of the first, second and third upstream supply chain entities respectively, the consumer receives the product at one of the first, second and third future dates from current inventory of one of the first, second and third upstream supply chain entities rather than from current inventory of the downstream supply chain entity in exchange for the one of the first, second and third incentives respectively.

20. The computer-readable media of claim 19, wherein at least one of the first, second and third incentives comprises a price discount on the product.

21. The computer-readable media of claim 19, wherein the software is further configured to:
collaborate with the first upstream supply chain entity to determine a cost at the first upstream supply chain entity associated with the consumer receiving the product from the current inventory of the first upstream supply chain entity;
determine a profit increase on the product at the downstream supply chain entity based on:
the cost at the first upstream supply chain entity associated with supplying the product from the current inventory of the first upstream supply chain entity; and
the cost savings to the downstream supply chain entity associated with the first order lead time; and
determine the first incentive based on the profit increase.

22. The computer-readable media of claim 19, wherein the software is further configured to collaborate with the first upstream supply chain entity to determine the first incentive based on one or more business rules associated with one or more of the downstream and first upstream supply chain entities.

23. The computer-readable media of claim 19, wherein the software is further configured to:
collaborate with the second upstream supply chain entity to determine a cost at the second upstream supply chain entity associated with the consumer receiving the product from the current inventory of the second upstream supply chain entity;
determine a profit increase on the product at the downstream supply chain entity based on:
the cost at the second upstream supply chain entity associated with supplying the product from the current inventory of the second upstream supply chain entity; and
the cost savings to the downstream supply chain entity associated with the second order lead time; and
determine the second incentive based on the profit increase.

24. The computer-readable media of claim 19, wherein the software is further configured to collaborate with one or both of the first and second upstream supply chain entities to determine the second incentive based on one or more business rules associated with one or more of the downstream and first and second upstream supply chain entities.

25. The computer-readable media of claim 19, wherein the consumer choosing to receive the product at one of the first, second and third future dates rather than the current date in exchange for one of the first, second and third incentives comprises one of:
a consumer purchasing the product via a consumer computer system at the current date;
a consumer committing at the current date to purchase the product via the consumer computer system at one of the first, second and third future dates; and
a consumer indicating an intention via the consumer computer system at the current date to purchase the product at one of the first, second and third future dates.

26. The computer-readable media of claim 19, wherein the consumer receiving the product at one of the first, second and third future dates comprises one of:
a consumer visiting the downstream supply chain entity at one of the first, second and third future dates to pick up the product;
the downstream supply chain entity delivering the product at one of the first, second and third future dates; and
one of the first, second and third upstream supply chain entities delivering the product at one of the first, second and third future dates.

27. The computer-readable media of claim 19, wherein when the consumer chooses to receive the product at the first future date in exchange for the first incentive, the software is further configured to determine whether the first upstream supply chain entity receives an initial payment at the current date based on one or more costs to the downstream supply chain entity associated with cancellation of the order.

28. A system of distributing consumer demand upstream in a supply chain, comprising:
one or more computer systems associated with a downstream supply chain entity, the one or more computer systems configured to:
receive, on a current date, a consumer demand for a product at a date after the current date;
determine a first incentive based on a first order lead time for the product, the first order lead time for the product representing a time difference between a first future date of a proposed delivery and the current date, the first order lead time is longer than a first supply channel delay between the downstream supply chain entity and a first upstream supply chain entity, and the first incentive is based at least partially on a cost savings to the downstream supply chain entity associated with the first order lead time;
determine a second incentive larger than the first incentive and based on a second order lead time for the product, the second order lead time for the product representing a time difference between a second future date and the current date, the second order lead time is longer than a second supply channel delay between the downstream supply chain entity and a second upstream supply chain entity, the second incentive reflecting collective cost savings to the downstream supply chain entity and the first upstream supply chain entity associated with the second order lead time;
determine a third incentive larger than the first incentive and the second incentive based on a third order lead time for the product, the third order lead time for the product representing a time difference between a third future date and the current date, the third order lead time is longer than a third supply channel delay between the downstream supply chain entity and a third upstream supply chain entity, the third incentive reflecting collective cost savings to the downstream supply chain entity and the second upstream supply chain entity associated with the third order lead time;

communicate the first, second and third incentives to a consumer computer system associated with a consumer, wherein the consumer computer system determines whether to receive the product at the first, second or third future date rather than the current date in exchange for the first, second or third incentive; and communicate an order for the product to one of the first, second and third upstream supply chain entities such that, when the order is successfully processed by one of the first, second and third upstream supply chain entities respectively, the consumer receives the product at one of the first, second and third future dates from current inventory of one of the first, second and third upstream supply chain entities rather than from current inventory of the downstream supply chain entity in exchange for one of the first, second and third incentives respectively.

* * * * *